United States Patent
Shimizu et al.

(10) Patent No.: US 6,917,481 B2
(45) Date of Patent: Jul. 12, 2005

(54) STRUCTURE FOR TIGHTLY CLOSING LIGHT EXIT END OF ROD INTEGRATOR AND ROD INTEGRATOR HOLDER

(75) Inventors: Hitoshi Shimizu, Saitama (JP); Tadashi Iwasawa, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 45 days.

(21) Appl. No.: 10/334,779

(22) Filed: Jan. 2, 2003

(65) Prior Publication Data

US 2003/0147154 A1 Aug. 7, 2003

(30) Foreign Application Priority Data

Feb. 7, 2002 (JP) ........................................ 2002-030665

(51) Int. Cl.[7] .............................................. G02B 7/02
(52) U.S. Cl. ...................... 359/819; 359/799; 359/800; 359/810; 359/830
(58) Field of Search ................................ 359/434, 856, 359/819, 830, 823, 825, 799, 800, 810; 385/31, 34, 901; 362/26, 551, 582, 32, 248, 253, 560, 553; 356/44; 349/61

(56) References Cited

U.S. PATENT DOCUMENTS

| | | | | |
|---|---|---|---|---|
| 5,727,105 A | * | 3/1998 | Nagata et al. ................ | 385/94 |
| 6,205,271 B1 | * | 3/2001 | Bowron et al. ............... | 385/31 |
| 6,236,449 B1 | * | 5/2001 | Tanitsu ......................... | 355/67 |
| 6,364,493 B1 | * | 4/2002 | Kakuta et al. ............. | 353/122 |
| 6,698,891 B2 | * | 3/2004 | Kato ............................ | 353/20 |
| 6,715,880 B2 | * | 4/2004 | Shouji ......................... | 353/20 |
| 2002/0008791 A1 | * | 1/2002 | Okamori et al. ............... | 349/5 |
| 2003/0031031 A1 | * | 2/2003 | Tiao et al. .................. | 362/560 |

FOREIGN PATENT DOCUMENTS

JP          08-227034         9/1996

\* cited by examiner

Primary Examiner—Ricky Mack
Assistant Examiner—Brandi Thomas
(74) Attorney, Agent, or Firm—Snider & Associates; Ronald R. Snider

(57) ABSTRACT

A rod integrator holder comprises a wall constituting at least a part of an intermediate portion interposed between a rod integrator in an illumination optical system or a holding member for the rod integrator, and an optical member disposed downstream the rod integrator or a holding member for the optical member. The intermediate portion tightly closes a space between a light entrance end of the optical member and a light exit end of the rod integrator against surroundings thereof.

23 Claims, 4 Drawing Sheets

STRUCTURE FOR TIGHTLY CLOSING LIGHT EXIT END OF ROD INTEGRATOR AND ROD INTEGRATOR HOLDER

RELATED APPLICATIONS

This application claims the priority of Japanese Patent Application No. 2002-030665 filed on Feb. 7, 2002, which is incorporated herein by reference.

BACKGROUND OF THE INVENTION

1. Field of the Invention

The present invention relates to a structure for tightly closing a light exit end of a rod integrator disposed on an optical path in order to homogenize the luminous flux density within a plane perpendicular to the optical axis in an illumination optical system of a projection type image display apparatus or the like, and a rod integrator holder.

2. Description of the Prior Art

In illumination optical systems of projection type image display apparatus such as video projectors in which illumination light is optically modulated by an image display device such as digital micromirror device (hereinafter referred to as "DMD") and thus modulated light is projected under magnification, optical prisms known as rod integrators have conventionally been used as means for homogenizing the luminous flux density in order to illuminate the image display device uniformly. The rod integrators have been configured such that an incident luminous flux is repeatedly totally reflected therewithin and then is emitted therefrom while the luminous flux density distribution within a plane perpendicular to the optical axis becomes substantially uniform. In particular, within an illumination optical system, a rod integrator is often disposed downstream a color wheel apparatus acting as color decomposing means.

As a holding structure for holding this kind of rod integrator within an illumination optical system, the type disclosed in Japanese Unexamined Patent Publication No. 8-227034, for example, has been known in general. This type of rod integrator holding structure is configured such that a rod integrator inserted in a hollow rod integrator holder made of die-cast aluminum or the like having a side face formed with an opening is supported at both ends of the rod integrator holder, and a side face of the rod integrator is pressed with a leaf spring attached to the opening so as to be secured to the rod integrator holder.

Meanwhile, heat sources such as a light source are disposed within a housing of a projection image display apparatus such as video projector in which a rod integrator is placed, and the housing is provided with intake and exhaust fans for letting out the heat emitted from the heat sources. Also, the apparatus housing is formed with an opening in the vicinity of each fan when appropriate so as to allow the air to communicate between the inside and outside thereof, through which dust, smoke, and the like may flow in.

In general, an illumination optical system using a rod integrator is configured such that the light exit face of the rod integrator and the device surface of an image display device have an optically conjugate relationship therebetween. Therefore, if the light exit face of the rod integrator is damaged or dust or the like attaches thereto, an image of dust or the like will be formed on the device surface of the image display device. The image of damage, dust, or the like formed on the device surface is superposed on an image displayed by the image display device, and is projected onto a screen under magnification.

It has been difficult for the above-mentioned conventional rod integrator support structure to prevent the dust, smoke, or the like having flown into the apparatus housing from attaching to the light exit face of the rod integrator and keep the light exit face from being damaged. As a consequence, there has been a fear of the image quality deteriorating on the screen when a rod integrator having such a support structure is used.

Also, the conventional rod integrator holder configured as mentioned above has failed to provide means for preventing the dust, smoke, and the like having flown into the apparatus housing from attaching to the light exit face of the rod integrator or keep the light exit face from being damaged. Therefore, it has been difficult for such a rod integrator holder to prevent dust or the like from attaching to the light exit face or keep the light exit face from being damaged, thus yielding a fear of the image quality deteriorating on the screen.

SUMMARY OF THE INVENTION

In view of the foregoing circumstances, it is an object of the present invention to provide a structure for tightly closing a light exit end of a rod integrator, and a rod integrator holder, which can prevent dust, smoke, and the like from attaching to the light exit face of the rod integrator and keep the light exit face from being damaged.

For achieving the above-mentioned object, the present invention provides a structure for tightly closing a light exit end of a rod integrator; the structure comprising an intermediate portion interposed between a rod integrator disposed so as to homogenize a luminous flux density in an illumination optical system or a holding member for the rod integrator, and an optical member disposed downstream the rod integrator or a holding member for the optical member; the intermediate portion tightly closing a space between a light entrance end of the optical member and a light exit end of the rod integrator against surroundings thereof.

Also, the present invention provides a rod integrator holder for holding a rod integrator disposed so as to homogenize a luminous flux density in an illumination optical system;

the rod integrator holder comprising a wall constituting at least a part of an intermediate portion interposed between the rod integrator or a holding member for the rod integrator, and an optical member disposed downstream the rod integrator or a holding member for the optical member; the intermediate portion tightly closing a space between a light entrance end of the optical member and a light exit end of the rod integrator against surroundings thereof.

In the rod integrator holder, the optical member may be a lens, whereas the wall may constitute the intermediate portion in cooperation with a lens barrel for holding the lens.

The rod integrator holder may comprise a tubular case for inserting and holding the rod integrator, and the wall shaped like a brim disposed substantially orthogonal to an axis of the case at an end part of the case; the brim-like wall abutting against an end part of the lens barrel so as to tightly close a space between the end part of the lens barrel and the end part of the case.

In the rod integrator holder, a side face of the case may be formed with an adhesive injection hole for injecting a predetermined adhesive, the rod integrator inserted in the case being secured and held within the case by the adhesive injected from the adhesive injection hole.

An outer peripheral part of the brim-like wall may be formed with a circumferential projection for covering an end part of the lens barrel when the brim-like wall abuts against the end part of the lens barrel.

DESCRIPTION OF THE PREFERRED EMBODIMENTS

In the following, embodiments of the present invention will be explained in detail with reference to specific examples.

Figure 5:
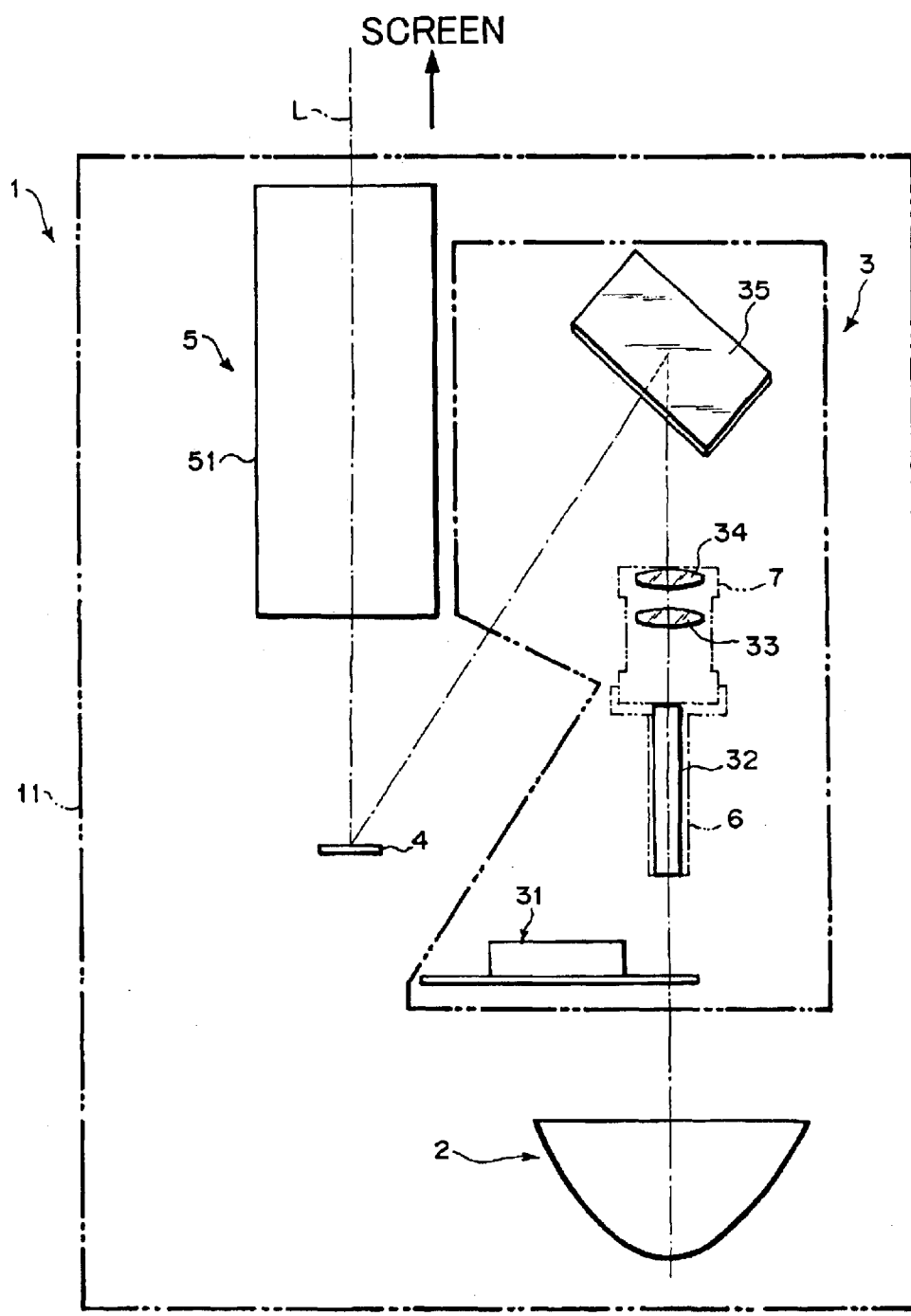
FIG. 5 is a schematic diagram showing a projector apparatus equipped with the structure shown in FIG. 1.

First, a specific configuration of a video projector employing the present invention will be explained in brief with reference to FIG. 5. FIG. 5 is a diagram illustrating a schematic configuration of a video projector employing the present invention.

The video projector 1 shown in FIG. 5 is a typical projection type image display apparatus. Within its housing 11, a light source section 2, an illumination optical system 3, an image display means 4, and a projection lens system 5 are disposed on an optical axis L.

The illumination optical system 3 comprises a color wheel apparatus 31 for decomposing a white luminous flux from the light source section 2 into three colors of R, G, and B in time series. Disposed downstream the color wheel apparatus 31 and held by a rod integrator holder 6 is a rod integrator 32 for homogenizing the density of color-decomposed luminous fluxes. A relay lens barrel 7 holding two relay lenses 33, 34 is disposed downstream the rod integrator 32, whereas a reflecting mirror 35 is placed downstream thereof. The illumination optical system 3 is configured such that the luminous flux incident thereon from the light source section 2 is converted into illumination light having a homogenized luminous flux density within a plane perpendicular to the optical axis L and thus obtained illumination light is emitted toward the image display means 4.

As the image display means 4, a DMD (digital micromirror device) is used, for example. The DMD comprises a mirror surface in which a very large number of (about 0.7 to 0.8 million) mirror devices (aluminum mirrors each having a rectangular form) are arranged on a substrate, and is configured such that the direction of reflection of each mirror device constituting the mirror surface is independently switchable between two directions (forming a narrow angle of 20° therebetween). The switching of reflecting directions is carried out by ON/OFF control of image signals (video signals) fed into the DMD using each mirror device as a pixel. Under this control, the image display means 4 converts the illumination light incident thereon from the illumination optical system 3 into image display light carrying image information and emits thus obtained image display light toward the projection lens system 5.

The projection lens system 5 comprises, though not depicted, a projection lens constituted by a plurality of lenses disposed in series on the optical axis L within the projection lens barrel 51, and a lens moving mechanism adapted to move the plurality of lenses in the direction of optical axis L so as to change the focal length, thereby altering the imaging magnification or the like. The projection lens system 5 is configured so as to project onto an image projection surface (screen) the image display light incident thereon from the image display means 4.

The video projector 1 comprises not only the light source section 2, but also heat sources such as a light source power supply, a circuit board, and an electric motor which are not depicted. In the vicinity of these heat sources, intake/exhaust fans (not depicted) for keeping the heat generated from the heat sources from staying within the housing 11 are disposed as appropriate. Further, though not depicted, the housing 11 is formed with an opening near each of the above-mentioned intake/exhaust fans as appropriate so as to allow the air to communicate between the inside and outside thereof.

A structure for tightly closing a light exit end of the rod integrator 32 will now be explained with reference to the drawings.

Figure 1:
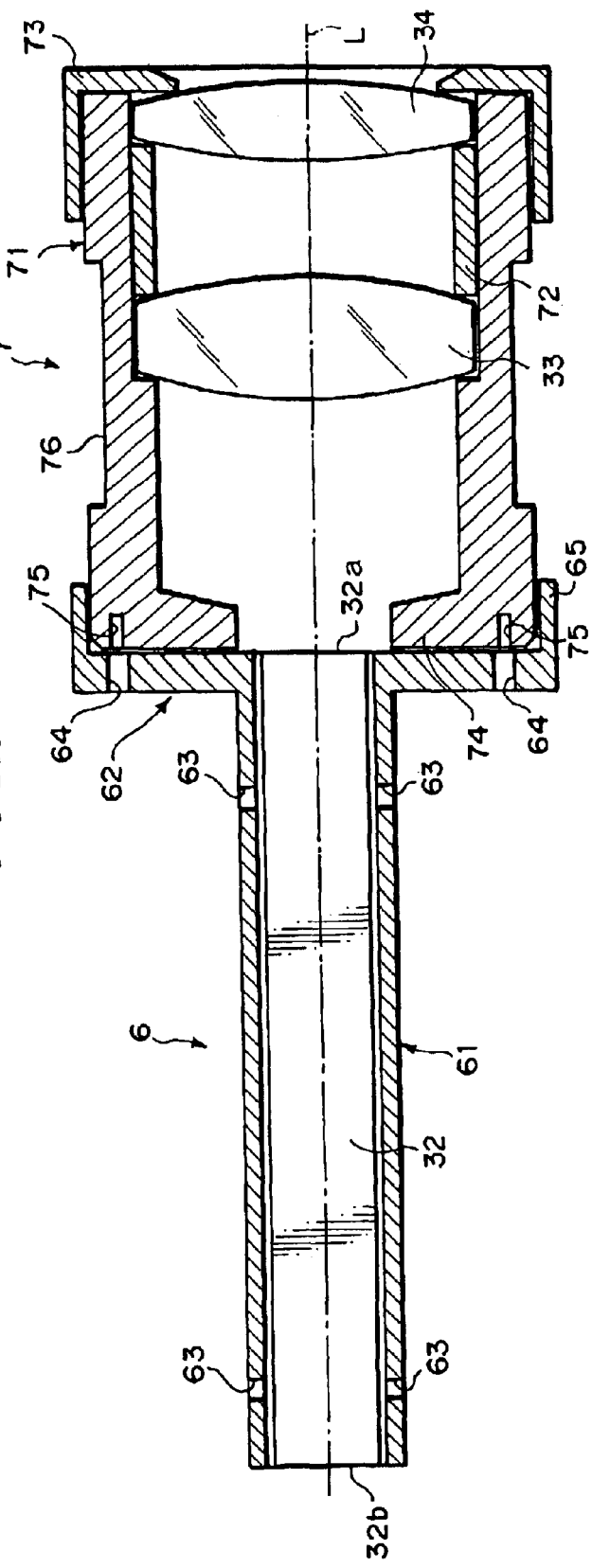
FIG. 1 is a sectional view showing the structure for tightly closing a light exit end of a rod integrator in accordance with an embodiment of the present invention.
Figure 2:
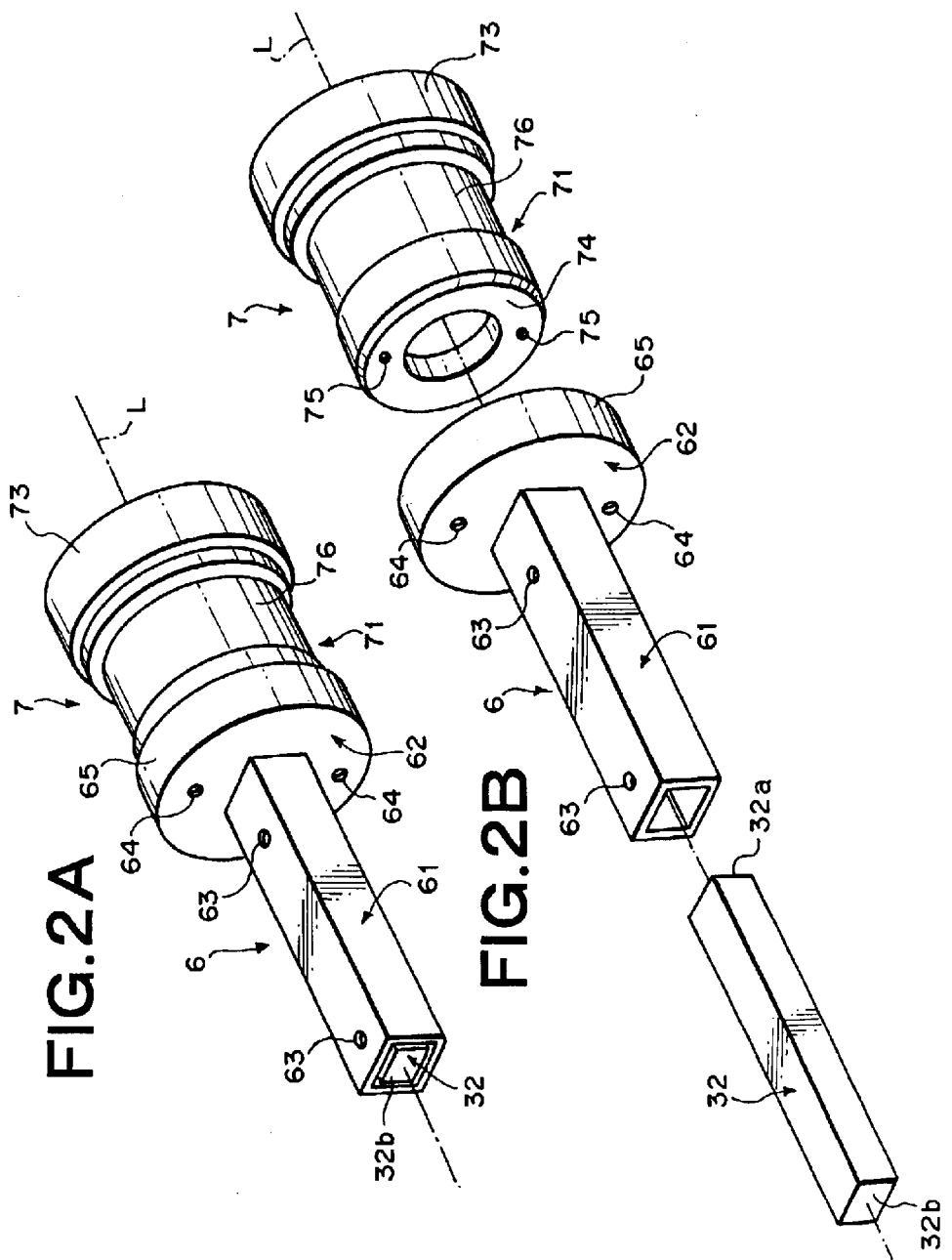
FIGS. 2A and 2B are perspective views showing the exterior of main parts of the structure shown in FIG. 1.
Figure 3:
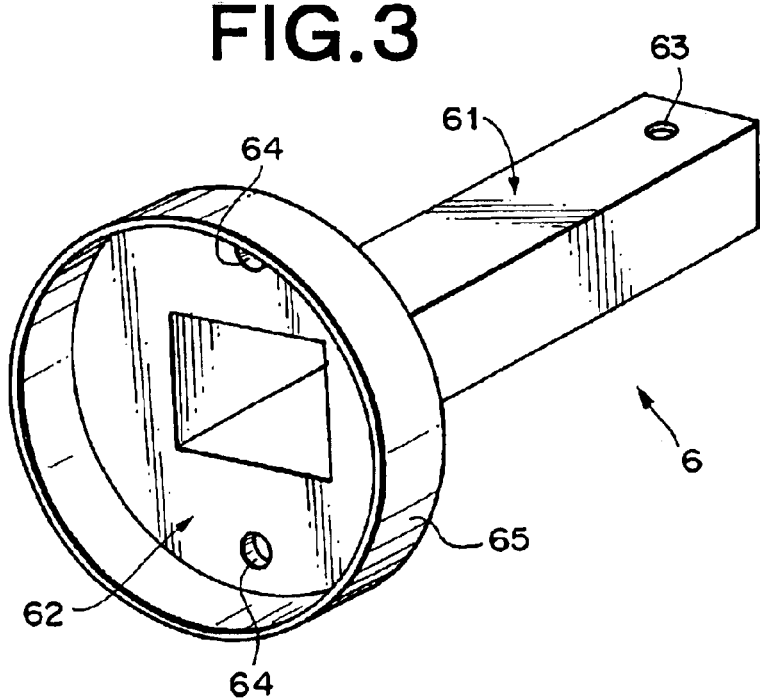
FIG. 3 is a perspective view showing the exterior of the rod integrator holder in accordance with an embodiment of the present invention.

FIG. 1 is a sectional view showing main parts of a structure for tightly closing a light exit end of the rod integrator 32 in a state partly cut along the optical axis L, FIGS. 2A and 2B are perspective views showing its exterior, and FIG. 3 is a perspective view of the exterior of the rod integrator holder 6. FIG. 2A shows a state where the rod integrator 32, rod integrator holder 6, and relay lens barrel 7 are assembled together, whereas FIG. 2B shows a state where they are disassembled.

As shown in FIG. 1, the structure in accordance with this embodiment comprises the rod integrator holder 6 holding the rod integrator 32, and the relay lens barrel 7 holding the relay lenses 33, 34.

As shown in FIGS. 2A and 2B and 3 as well, the rod integrator holder 6 comprises a case 61 having a rectangular frame-like cross section for inserting the rod integrator 32, and a brim-like wall 62 formed at one end part (the end part closer to the light exit face 32a of the inserted rod integrator 32) in the axial direction (length direction) of the case 61. As shown in FIG. 1, adhesive injection holes 63 for injecting a predetermined adhesive are formed two by two in the upper and lower side faces of the case 61, whereby the rod integrator 32 inserted in the case 61 is secured and held within the case 61 by the adhesive injected from the adhesive injection holes 63. Also, the brim-like wall 62 is formed like a disk substantially orthogonal to an axis of the case while being centered at this axis. Screw holes 64 for inserting screws, which are not depicted, are formed one by one at upper and lower positions in the brim-like wall 62 across the case 61. Further, the outer periphery of the brim-like wall 62 is formed with a circumferential projection 65 rising toward the relay lens barrel 7. Here, the case 61, brim-like wall 62, and circumferential projection 65 are integrally formed by deep drawing.

On the other hand, the relay lens barrel 7 comprises a barrel body 71 formed substantially cylindrical, a spacer ring 72 disposed between the two relay lenses 33, 34 held within the barrel body 71, and a support ring 73 attached to the light exit end side of the barrel body 71. The light entrance end of the barrel body 71 is formed with an abutment 74 adapted to abut against the brim-like wall 62 of the rod integrator holder 6. The abutment 74 is formed with screw receiving holes 75 at respective positions corresponding to the screw holes 64 formed in the brim-like wall 62. Further, the outer peripheral face of the barrel body 71 is formed with a band-like groove 76 recessed from the surroundings.

Thus configured rod integrator holder 6 and relay lens barrel 7 are brought into contact with each other while in a state where the screw holes 64 formed in the brim-like wall 62 of the rod integrator 6 and the screw receiving holes 75 formed in the abutment 74 of the relay lens barrel 7 align with each other, and are connected to each other with screws, which are not depicted, so as to be secured. The projection 65 formed at the outer periphery of the brim-like wall 62 has an inner diameter slightly greater than the outer diameter of the light entrance end of the barrel body 71, so as to facilitate the positioning of the rod integrator holder 6 and the relay lens barrel 7 in directions orthogonal to the optical axis L, and cover the outer periphery of the light entrance end of the barrel body 71 when the rod integrator holder 6 and the relay lens barrel 7 are connected to each other, whereby the airtightness therebetween can be enhanced.

The rod integrator 32 is held within the case 61 of the rod integrator holder 6 without exposing itself except for the light entrance and exit faces, whereby the possibility of the rod integrator 32 being damaged upon handling can be lowered. Further, the brim-like wall 62 and circumferential projection 65 of rod integrator holder 6 formed on the exit face 32a side of the rod integrator 32 function to prevent the exit face 32a from coming into contact with other members and the like, whereby the possibility of the exposed exit face 32a being damaged upon handling can be reduced as well. Therefore, the rod integrator 32 held by the rod integrator holder 6 is quite easy to handle at the time of assembling and the like.

As shown in FIG. 1, when the rod integrator holder 6 and the relay lens barrel 7 are connected to each other, the opening on the entrance end side of the barrel body 71 is closed with the brim-like wall 62 of the rod integrator holder 6. Consequently, the space between the light exit face 32a of the rod integrator 32 and the entrance face of the relay lens 33 is tightly closed by the brim-like wall 62 of the rod integrator holder 6 and the barrel body 71 against the surroundings, whereby the light exit face 32a of the rod integrator 32 is prevented from being damaged or dust and the like are kept from attaching thereto. Thus, in this embodiment, an intermediate portion is constituted by the brim-like wall 62 of rod integrator holder 6 and the barrel body 71.

In this embodiment, respective sizes of individual parts of the rod integrator holder 6 and relay lens barrel 7 are determined such that a predetermined optical length can immediately be secured between the light exit face 32a of rod integrator 32 and the relay lens 33 when the rod integrator 6 and the relay lens barrel 7 are connected to each other, which makes it easier to place them into the illumination optical system 3.

Figure 4:
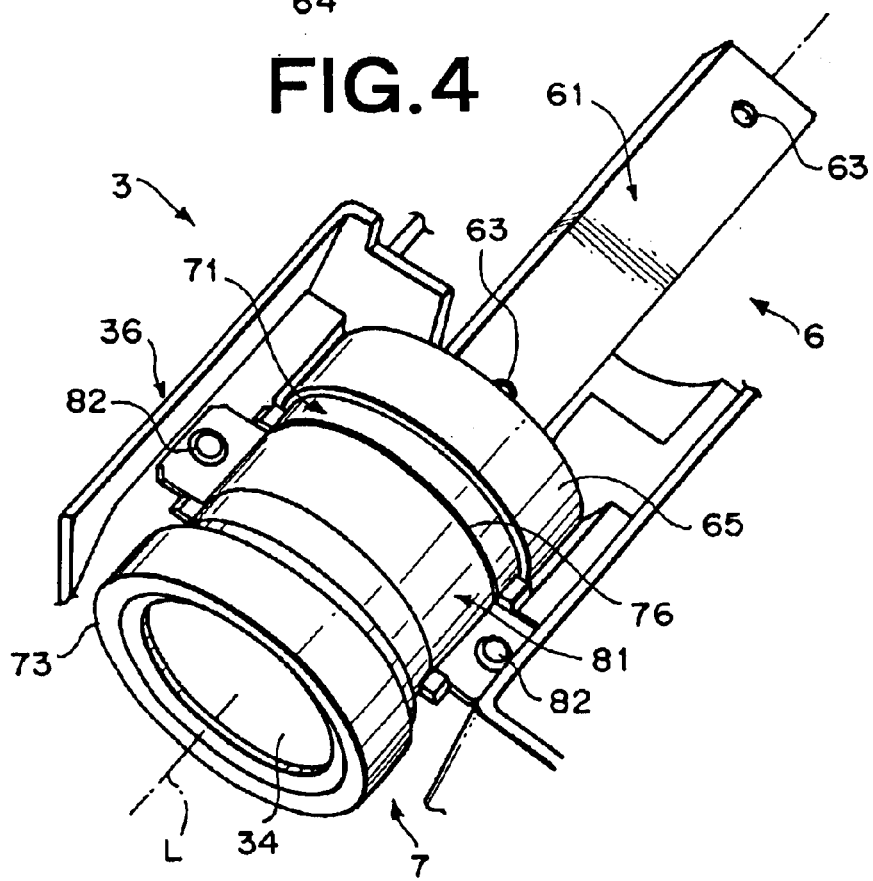
FIG. 4 is a perspective view showing the exterior of the whole structure shown in FIG. 1.

FIG. 4 shows the rod integrator holder 6 and relay lens barrel 7 disposed within the illumination optical system 3. The rod integrator holder 6 and relay lens barrel 7 connected to each other as mentioned above are attached to a mount 36 disposed within the illumination optical system 3 by way of a semi-annular attachment 81 for pressing the groove 76 formed in the outer peripheral face of the body 71 against the mount 36 and attachment screws 82 for securing the attachment 81 to the mount 36.

As mentioned above, the luminous flux incident on the illumination optical system 3 from the light source section 2 is decomposed by the color wheel apparatus 31 into individual color components in time series. In the rod integrator holder 6 and relay lens barrel 7 configured and placed within the illumination optical system 3 as mentioned above, the luminous flux is made incident on the light entrance end face 32b of the rod integrator 32 and then, after having its density homogenized by the rod integrator 32, is emitted toward the reflecting mirror 35 by way of the relay lenses 33, 34.

The luminous flux incident on the reflecting mirror 35 is emitted toward the image display means 4, and caused to carry image information in the image display means 4. Thereafter, a projection image is displayed on the screen by way of the projection lens within the projection lens barrel 51 (see FIG. 5).

Though an embodiment of the present invention is explained in the foregoing, the present invention can be modified in various manners without being restricted to the above-mentioned embodiment.

For example, though the outer periphery of the brim-like wall in the rod integrator holder in the above-mentioned embodiment is equipped with a projection, such a projection may be omitted if a sufficiently airtight state can be obtained by the brim-like wall alone.

For securing a more reliably airtight state, an O-ring made of rubber or the like may be interposed between the brim-like wall of the rod integrator holder and the abutment of the relay lens barrel.

Further, though the intermediate portion is constituted by the brim-like wall of the rod integrator holder and the barrel body in the above-mentioned embodiment, a separate member may be disposed therebetween so as to constitute at least a part of the intermediate portion. Alternatively, the circumferential projection in the embodiment may further be extended into a cylindrical form toward the relay lens barrel so as to join the barrel body at a front end part of the cylindrical projection. In this case, the intermediate portion is constituted by the brim-like wall and projection of rod integrator holder and the barrel body.

In the above-mentioned embodiment, a relay lens is disposed downstream the rod integrator, whereas the intermediate portion is constructed therebetween. In a structure in which optical members such as a mirror, an optical prism, a stop, and a polarizer, for example, other than the relay lens are disposed downstream the rod integrator, an intermediate portion may be constructed between the rod integrator and these optical members.

Though the rod integrator is constituted by a rod-shaped optical prism in the above-mentioned embodiment, hollow type rod integrators with mirror surfaces in their inner faces have also been known. Such a hollow type rod integrator is formed, for example, by four oblong glass sheets, each having one surface provided with a reflective coating, which are bonded and assembled into a box having a rectangular cross section in which the reflective coating surfaces face inside. Though the luminous flux incident on the hollow type rod integrator is guided to the light exit end while being reflected by the mirror surfaces of the inner wall faces a plurality of times, the light exit end has no end face which may be damaged or bear dust attached thereto as in the prism type mentioned above. However, it may be problematic as with the prism type in that its optical characteristics will be lost if dust and the like attach to the mirror surfaces of its inner wall faces. The present invention is also applicable to rod integrators of the hollow type.

The present invention is usable not only in the above-mentioned video projector, but also in various optical instruments using a rod integrator.

As explained in detail in the foregoing, each of the structure for tightly closing a light exit end of a rod integrator and the rod integrator holder in accordance with the present invention comprises an intermediate portion, interposed between an optical member disposed downstream a rod integrator in an illumination optical system or a holding member for the optical member and the rod integrator or a holding member therefor, for tightly closing a space between a light entrance end of the optical member and a light exit end of the rod integrator against surroundings thereof, thereby achieving the following effects.

Namely, since the intermediate portion tightly closes the space near the light exit end of the rod integrator against the surroundings, it can prevent the light exit face of the rod integrator from being damaged or keep dust, smoke, and the like from attaching thereto. Therefore, it can prevent images of dust and the like from being formed on the device surface of the image display device and being projected onto the screen under magnification, which is a problem occurring when the light exit face of the rod integrator is damaged or dust and the like attach thereto.

What is claimed is:

1. A rod integrator holder for holding a rod integrator disposed so as to homogenize a luminous flux density in an illumination optical system;

said rod integrator holder comprising a wall constituting at least a part of an intermediate portion interposed between said rod integrator or a holding member for said rod integrator, and an optical member disposed downstream said rod integrator or a holding member for said optical member; said intermediate portion tightly closing a space between a light entrance end of said optical member and a light exit end of said rod integrator against surroundings thereof, wherein the space has no optical member.

2. A rod integrator holder according to claim 1, wherein said optical member is a lens; and wherein said wall constitutes said intermediate portion in cooperation with a lens barrel for holding said lens.

3. A rod integrator holder according to claim 2, wherein said rod integrator holder comprises a tubular case for inserting and holding said rod integrator, and said wall shaped like a brim disposed substantially orthogonal to an axis of said case at an end part of said case; said brim-like wall abutting against an end part of said lens barrel so as to tightly close a space between said end part of said lens barrel and said end part of said case.

4. A rod integrator holder according to claim 3, wherein a side face of said case is formed with an adhesive injection hole for injecting a predetermined adhesive, said rod integrator inserted in said case being secured and held within said case by said adhesive injected from said adhesive injection hole.

5. A rod integrator holder according to claim 3, wherein an outer peripheral part of said brim-like wall is formed with a circumferential projection for covering said end part of said lens barrel when said brim-like wall abuts against said end part of said lens barrel.

6. A rod integrator holder according to claim 3, wherein said case and said wall are integrally formed by deep drawing.

7. A rod integrator holder according to claim 3, wherein an O-ring is interposed between said brim-like wall and said end part of said lens barrel.

8. A rod integrator holder according to claim 3, wherein at least a part of said intermediate portion is constituted by a member separate from said brim-like wall and lens barrel.

9. A rod integrator holder according to claim 5, wherein said circumferential projection is formed like a cylinder extending toward said lens barrel so as to join said lens barrel at a front end part of said cylinder.

10. A rod integrator holder according to claim 1, wherein said rod integrator is solid.

11. A rod integrator holder according to claim 1, wherein said rod integrator is hollow.

12. A projection type image display apparatus having an image display device surface, wherein said image display device surface and a light exit end face of a rod integrator have an optically conjugate relationship therebetween; said structure comprising an intermediate portion interposed between a rod integrator disposed so as to homogenize a luminous flux density in an illumination optical system or a holding member for said rod integrator, and an optical member disposed downstream said rod integrator or a holding member for said optical member; said intermediate portion tightly closing a space between a light entrance end of said optical member and a light exit end of said rod integrator against surroundings thereof.

13. A projection type display apparatus having a display device surface, wherein said image display device surface and a light exit end face of a rod integrator have an optically conjugate relationship therebetween;

wherein a rod integrator is disposed so as to homogenize a luminous flux density in an illumination optical system;

said rod integrator holder comprising a wall constituting at least a part of an intermediate portion interposed between said rod integrator or a holding member for said rod integrator, and an optical member disposed downstream said rod integrator or a holding member for said optical member; said intermediate portion tightly closing a space between a light entrance end of said optical member and a light exit end of said rod integrator against surroundings thereof.

14. A rod integrator holder according to claim 13, wherein said optical member is a lens; and wherein said wall constitutes said intermediate portion in cooperation with a lens barrel for holding said lens.

15. A rod integrator holder according to claim 14, wherein said rod integrator holder comprises a tubular case for inserting and holding said rod integrator, and said wall shaped like a brim disposed substantially orthogonal to an axis of said case at an end part of said case; said brim-like wall abutting against an end part of said lens barrel so as to tightly close a space between said end part of said lens barrel and said end part of said case.

16. A rod integrator holder according to claim 15, wherein a side face of said case is formed with an adhesive injection hole for injecting a predetermined adhesive, said rod integrator inserted in said case being secured and held within said case by said adhesive injected from said adhesive injection hole.

17. A rod integrator holder according to claim 15, wherein an outer peripheral part of said brim-like wall is formed with a circumferential projection for covering said end part of said lens barrel when said brim-like wall abuts against said end part of said lens barrel.

18. A rod integrator holder according to claim 15, wherein said case and said wall are integrally formed by deep drawing.

19. A rod integrator holder according to claim 15, wherein an O-ring is interposed between said brim-like wall and said end part of said lens barrel.

20. A rod integrator holder according to claim 15, wherein at least a part of said intermediate portion is constituted by a member separate from said brim-like wall and lens barrel.

21. A rod integrator holder according to claim 17, wherein said circumferential projection is formed like a cylinder extending toward said lens barrel so as to join said lens barrel at a front end part of said cylinder.

22. A rod integrator holder according to claim 13, wherein said rod integrator is solid.

23. A rod integrator holder according to claim 13, wherein said rod integrator is hollow.

* * * * *